United States Patent [19]
Friesen et al.

[11] Patent Number: 5,464,540
[45] Date of Patent: Nov. 7, 1995

[54] PERVAPORATION BY COUNTERCURRENT CONDENSABLE SWEEP

[75] Inventors: Dwayne T. Friesen; David D. Newbold; Scott B. McCray; Roderick J. Ray, all of Bend, Oreg.

[73] Assignee: Bend Research, Inc., Bend, Oreg.

[21] Appl. No.: 165,446

[22] Filed: Dec. 9, 1993

[51] Int. Cl.$^6$ .................................................. B01D 61/36
[52] U.S. Cl. ........................... 210/640; 210/774; 210/805; 210/806
[58] Field of Search .................................. 210/634, 637, 210/640, 641, 644, 649, 650, 774, 804, 805, 806, 808, 195.2; 95/253, 266

[56] References Cited

U.S. PATENT DOCUMENTS

| | | | |
|---|---|---|---|
| 2,958,656 | 11/1960 | Stuckey | 210/640 |
| 3,043,891 | 7/1962 | Stuckey | 210/640 |
| 3,634,128 | 1/1972 | Bolin | 210/640 |
| 4,900,402 | 2/1990 | Kaschemekat et al. | 210/644 |
| 4,944,882 | 7/1990 | Ray et al. | 210/644 |
| 5,041,227 | 8/1991 | Van Eikeren et al. | 210/640 |

*Primary Examiner*—Joseph W. Drodge
*Attorney, Agent, or Firm*—Chernoff, Vilhauer, McClung & Stenzel

[57] ABSTRACT

There is described a process for the removal of at least one component of a liquid mixture, the basic process comprising directing a liquid mixture against the feed side of a membrane, directing a condensable vapor sweep stream past the permeate side of the membrane in a manner such that the flow of the condensable vapor sweep is substantially countercurrent to the flow of the liquid mixture, thereby transporting at least a portion of at least one component of the liquid mixture from the feed side to the permeate side of the membrane to form a combined permeate side mixture of condensable vapor and at least one transported component.

31 Claims, 12 Drawing Sheets

PERVAPORATION BY COUNTERCURRENT CONDENSABLE SWEEP

BACKGROUND OF THE INVENTION

Pervaporation is a membrane-based process that can be used to remove a vaporizable component from a liquid mixture. In an example of such a process, water containing low concentrations of at least one organic compound is fed at essentially ambient pressure to the feed side of a membrane, while a vacuum pump or a gaseous sweep stream maintains a sufficiently low partial pressure of the organic compound on the permeate side of the membrane to provide a chemical potential gradient of the organic compound across the membrane. The organic compound and some of the water vaporize from the permeate side of the membrane to form a vapor-phase permeate.

One problem commonly associated with pervaporation is economically providing and maintaining the chemical potential gradient across the membrane. Those pervaporation processes employing a vacuum pump or condenser to provide the necessary chemical potential gradient are energy-intensive and thus expensive to operate. As the concentration of the organic compound in the feed stream is reduced to low levels, the partial pressure of the vaporizable organic compound in the permeate stream must be kept even lower for permeation and therefore separation to take place. If a vacuum pump is used to maintain the difference in partial pressure of the organic compound in equilibrium with he liquid feed stream and the partial pressure of the vaporizable organic compound in the vapor-phase permeate, the pump must maintain a very high vacuum, thus incurring high capital and operating costs. Similarly, if a condenser is used, extremely low temperatures must be maintained, requiring a costly and complicated refrigeration system.

A noncondensable sweep gas has been used to provide the driving force for the transport of vaporizable components across a pervaporation membrane. Although such a practice eliminates the vacuum pump-related problems associated with pervaporation, it introduces other problems associated with separating the condensable permeate from the noncondensable sweep gas. See, for example, Hoover et al., 10 *J. Memb. Sci.* 253 (1982).

Lee et al., in U.S. Pat. Nos. 4,933,198, 5,013,447 and 5,143,526, disclose a process for treating alcoholic beverages by pervaporation using a noncondensable sweep gas or vacuum. Although the sweep gas streams disclosed by Lee et al. may comprise water or ethanol, conditions in the sweep gas stream are controlled to ensure that these components are present only as noncondensable gas vapors and thus, no advantage from the use of a condensable sweep was recognized.

Another problem associated with pervaporation is providing the heat energy required for the vaporization of the permeate. In conventional processes the energy for this vaporization comes from sensible heat in the feed stream. However, as more and more permeate is removed from the feed, the temperature in the feed stream decreases. At such reduced temperatures, the partial pressure of the compound in equilibrium with the liquid feed is also reduced, reducing the driving force, thus causing the flux to decrease, which is undesirable. It is often necessary to employ a series of membranes separated by feed stream reheaters to maintain the temperature and increase the average flux. This practice results in increased costs and system complexity.

In 25 *J. Memb. Sci.* 25 (1985), Rautenbach et al. examined the use of a co-current condensable sweep as a source of heat. However, based on their calculations, the latent heat of the vapor carrier could be utilized only partially and, therefore, the use of a condensable vapor sweep in a pervaporation process would not be desirable.

Contrary to the currently accepted view, the present invention demonstrates that a pervaporation process utilizing a condensable vapor sweep is feasible.

SUMMARY OF THE INVENTION

The present invention solves the problems associated with pervaporation processes by using a countercurrent condensable vapor sweep stream to provide and maintain the chemical potential gradient across the membrane. Another feature of the present invention is that the use of a condensable vapor sweep stream can provide a portion of the heat energy required for vaporization of the permeate.

In its broadest aspect, the invention comprises a process for the removal of at least one component of a liquid mixture, comprising directing a liquid mixture against the feed side of a membrane, directing a condensable vapor sweep stream past the permeate side of the membrane in a manner such that the flow of the condensable vapor sweep is substantially countercurrent to the flow of the liquid mixture, thereby transporting at least a portion of at least one component of the liquid mixture from the feed side to the permeate side of the membrane to form a combined permeate side mixture of condensable vapor and at least one transported component, and collecting the combined permeate side mixture. The transported component can then be recovered by separating the transported component from the combined permeate side mixture.

As compared to conventional vacuum-driven pervaporation, pervaporation performed in accordance with the present invention results in significantly higher permeate fluxes due to increased driving force, while maintaining the same or greater separation factor, and assists in maintaining the temperature of the feed stream sufficiently high. In addition, the use of a condensable vapor sweep stream allows the driving force for transport to be maintained without the need for high vacuum.

DETAILED DESCRIPTION

Figure 1:
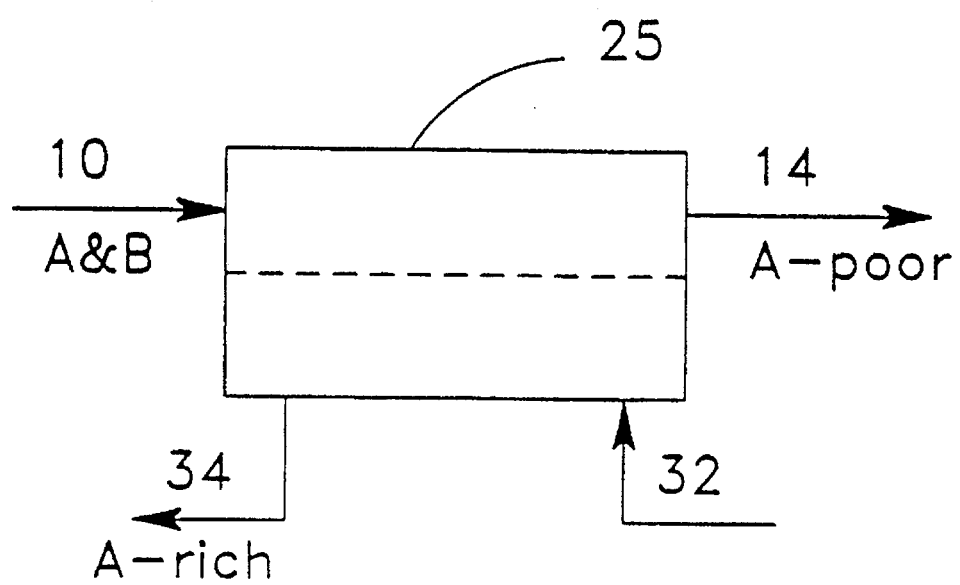
FIGS. 1–12 are schematic diagrams of exemplary systems for conducting the countercurrent condensable sweep pervaporation process of the present invention.

Referring now to the drawings, wherein like elements are designated by the same numerals, FIG. 1 depicts a system wherein a feed stream 10 containing at least two components A and B is fed to a membrane module 25. A condensable vapor sweep stream 32 is fed to the permeate side of the membrane module 25 at a vapor inlet port located near the retentate end of the module so as to flow countercurrent to the feed stream. One of the components of the feed stream (component A) is selectively removed in the membrane module, producing a retentate stream 14 depleted in component A ("A-poor"). Condensable vapor sweep stream 32 is combined with the vaporous permeate enriched in component A ("A-rich") from the membrane module, producing a combined permeate side mixture 34 which exits from the module at a vapor outlet port located near the feed end of the module.

Figure 2:
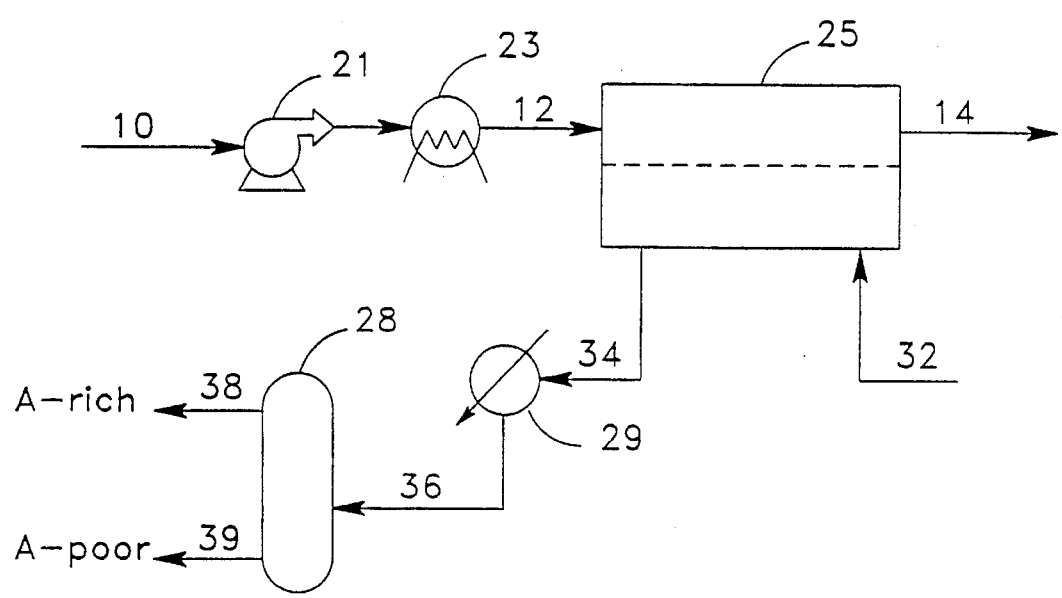

FIG. 2 depicts a system wherein a feed stream 10 containing at least two components is circulated by circulation pump 21 and heated in heater 23 to form a heated stream 12. Heated stream 12 is circulated to a membrane module 25. A condensable vapor sweep stream 32 is fed to the permeate side of the membrane module 25 at a vapor inlet port located near the retentate end of the module so as to flow countercurrent to the feed stream. One of the components of the feed stream (component A) is selectively removed in the membrane module, producing a retentate stream 14 depleted in component A. Condensable vapor sweep stream 32 is combined with the vaporous permeate enriched in component A from the membrane module, producing a combined permeate side mixture 34 which exits from the membrane module at a vapor outlet port located near the feed end of the module. Combined permeate side mixture 34 then enters a condenser 29, where the combined permeate side mixture is condensed to form condensed permeate 36. Condensed permeate 36 is directed to a separation apparatus 28, producing a stream 38 enriched in component A, and a stream 39 depleted in component A.

Figure 3:
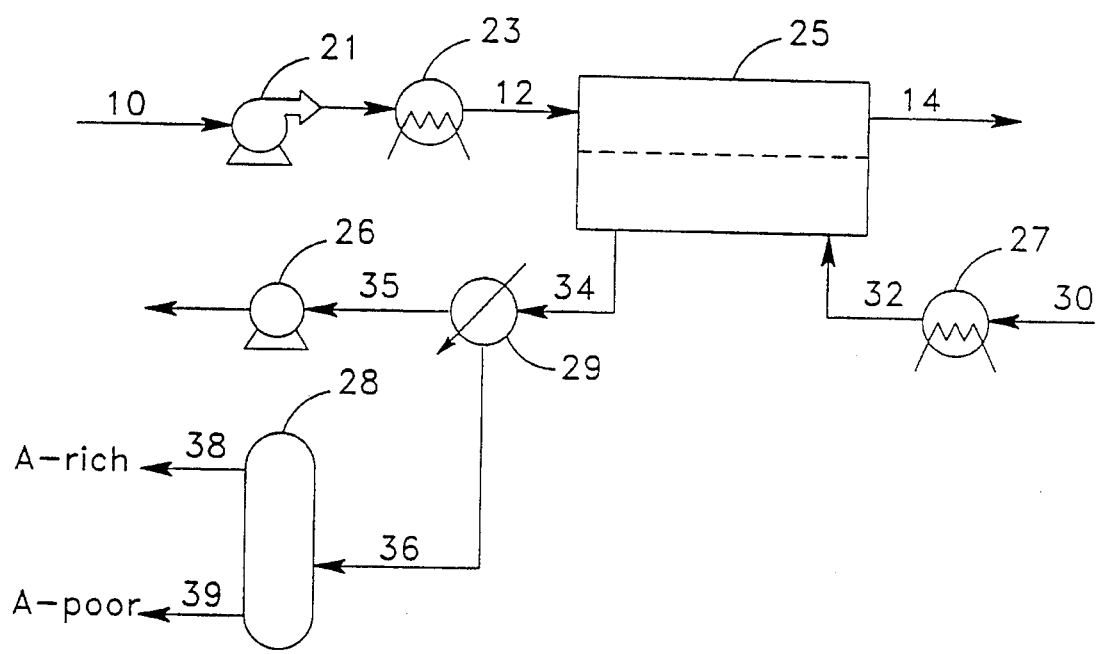

FIG. 3 is a schematic of a system that is essentially the same as the system depicted in FIG. 2, except that the condensable vapor sweep stream 32 is produced from a liquid stream 30 using a vapor generator 27. Additionally, FIG. 3 shows a stream of noncondensable components 35, which may have entered the system, exiting condenser 29. These noncondensable components are then removed using vacuum pump 26.

Figure 4:
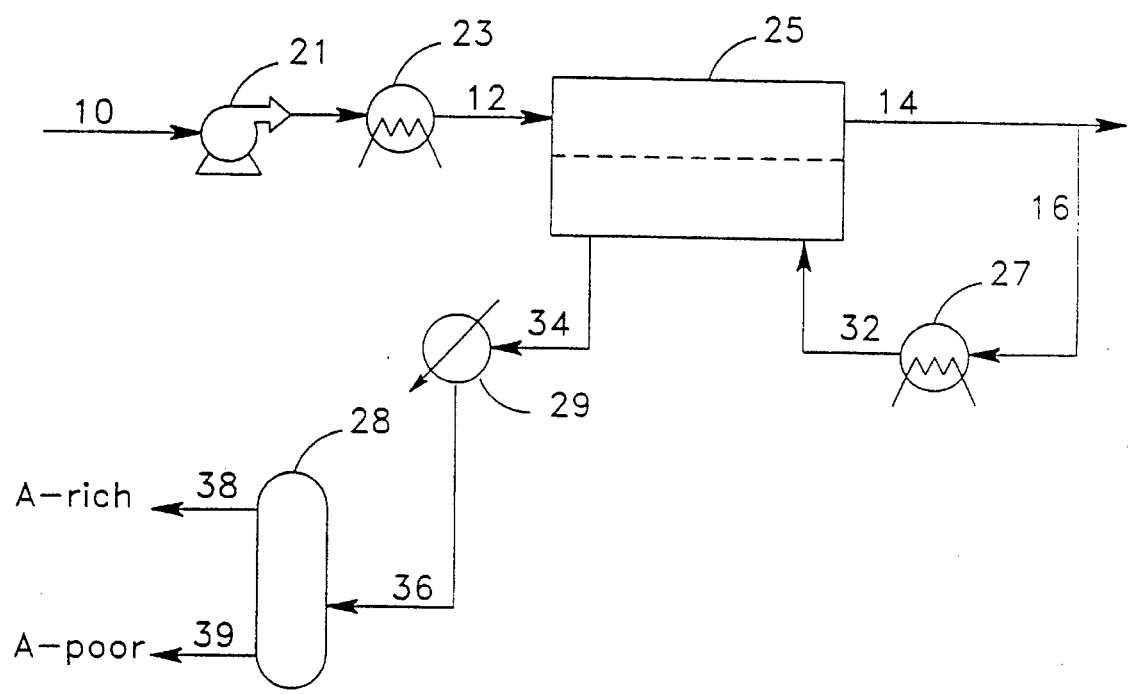

FIG. 4 is a schematic of a system that is also essentially the same as the system depicted in FIG. 2 except that a portion 16 of the depleted retentate stream 14 is used for the condensable vapor sweep stream 32.

Figure 5:
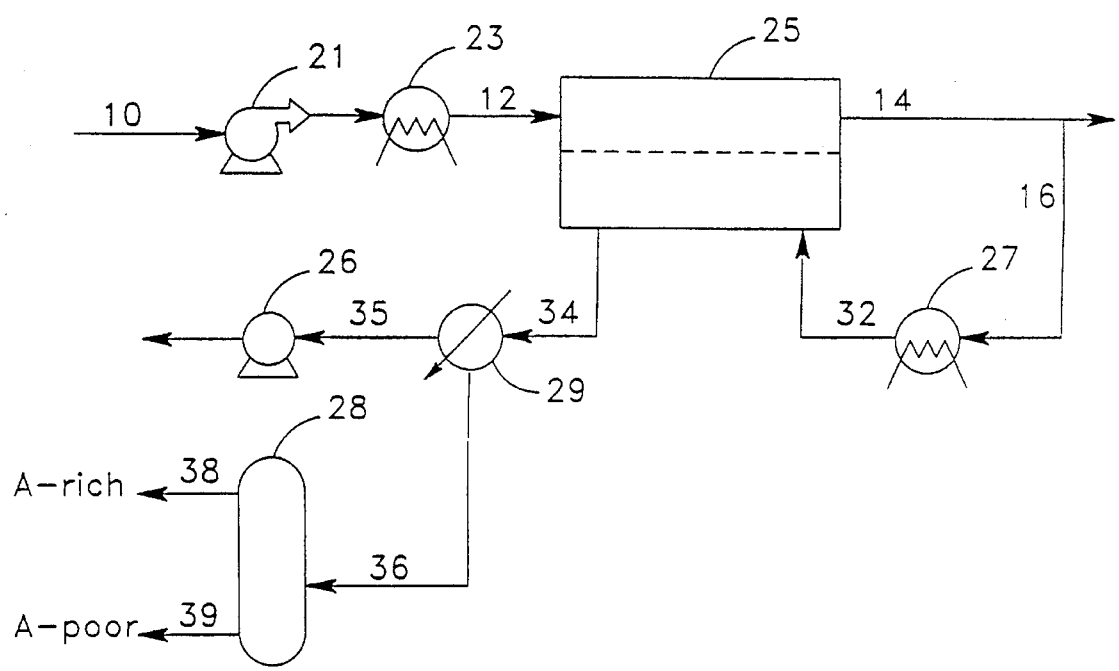

FIG. 5 is a schematic of a system that is essentially the same as the system depicted in FIG. 3 except that a portion 16 of the depleted retentate stream 14 is used for the condensable vapor sweep stream 32.

Figure 6:
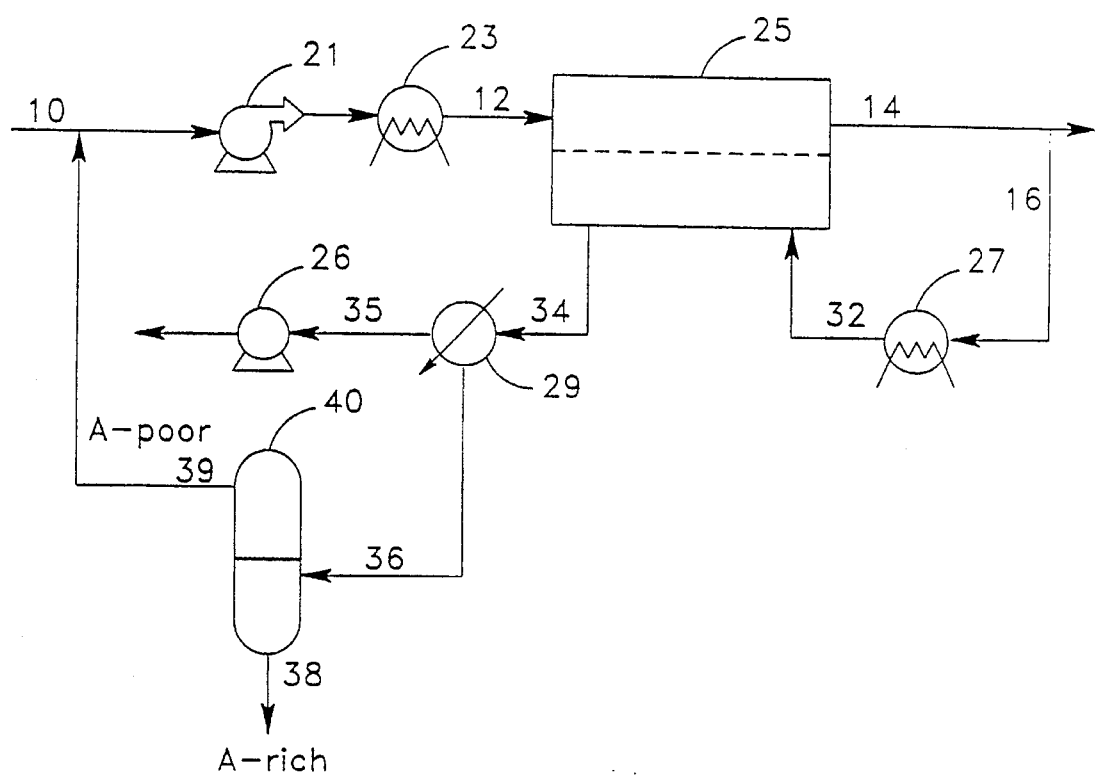

FIG. 6 depicts a system similar to the system depicted in FIG. 5 except that a decantation/phase separation apparatus 40 is specified as the separation apparatus. This embodiment is useful when component A is not 100% miscible with the liquid used to form the condensable vapor sweep stream. The purified component A 38 is withdrawn from the decantation process, while the stream 39 depleted in component A is recycled to the feed stream 10.

Figure 7:
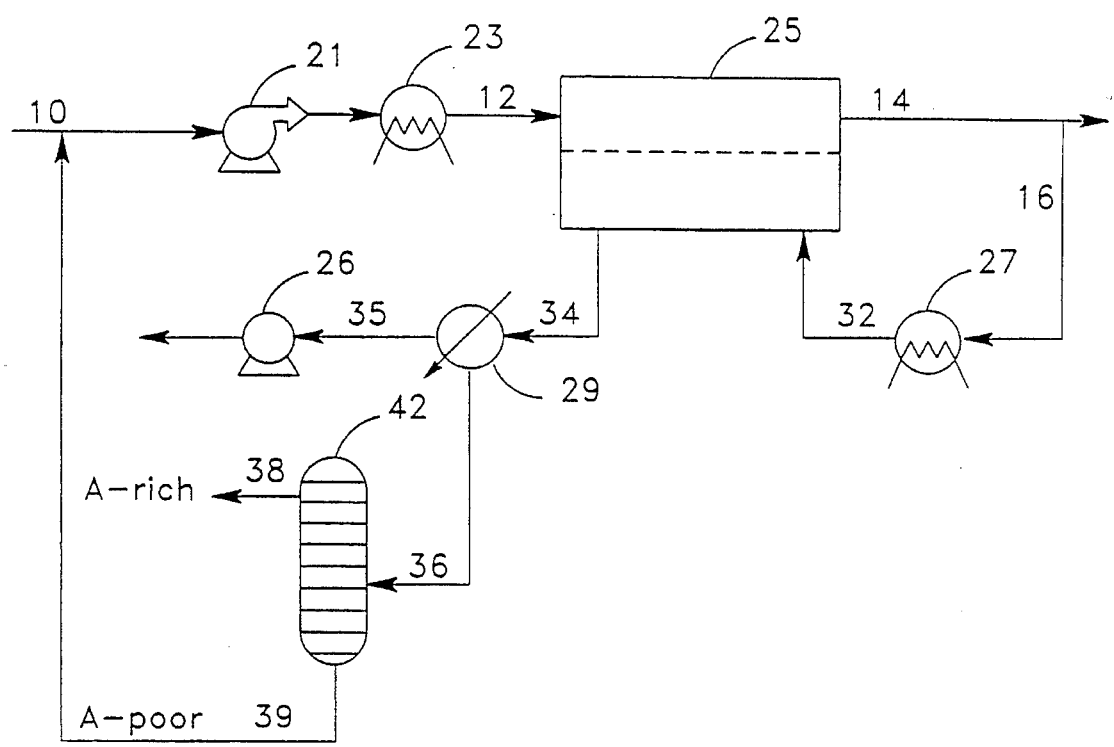

FIG. 7 shows a system similar to the system depicted in FIG. 4 except that a distillation/evaporation apparatus 42 is specified as the separation apparatus. This embodiment is useful when component A is 100% miscible with the liquid used to form the condensable vapor sweep stream. The purified component A 38 is removed from the distillation process, while the stream 39 depleted in component A is recycled to the feed stream.

Figure 8:
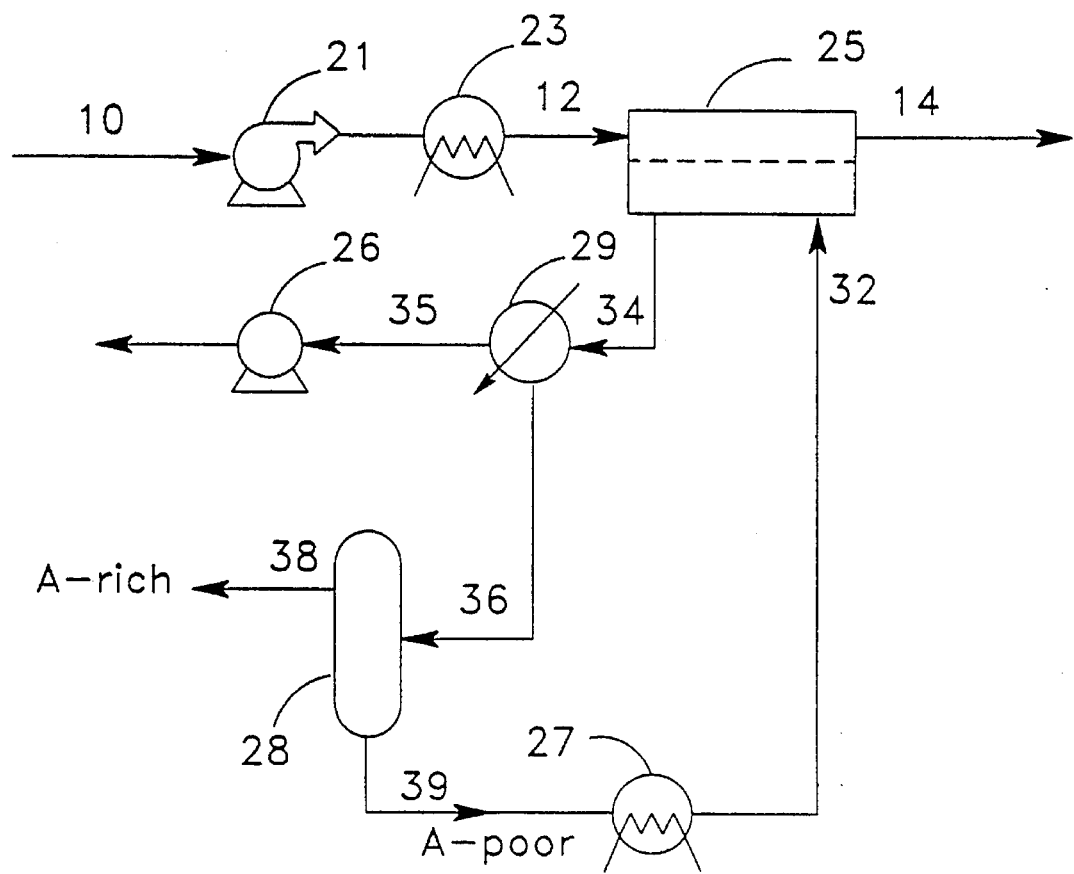

FIG. 8 depicts essentially the same system as shown in FIG. 3 except that stream 39 depleted in component A from separation apparatus 28 is directed to a vapor generator 27 to produce condensable vapor sweep stream 32.

Figure 9:
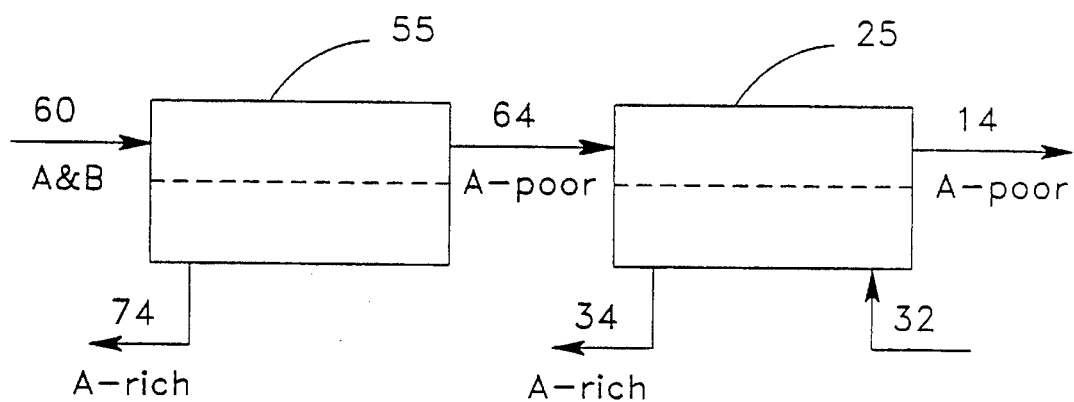

FIG. 9 depicts a system wherein a feed stream 60 containing at least two components is first fed to a conventional pervaporation membrane module 55. One of the components of the feed stream (component A) is selectively removed in the module 55, producing a retentate stream 64 partially depleted in component A and a vaporous permeate stream 74 enriched in component A. The partially depleted retentate stream 64 is fed to a countercurrent condensable sweep membrane module 25 of the present invention. A condensable vapor sweep stream 32 is fed to the permeate side of module 25 at a vapor inlet port located near the retentate end of the module so as to flow countercurrent to the feed stream. Component A is selectively removed in module 25, producing a retentate stream 14 depleted in component A. Condensable vapor sweep stream 32 is combined with the vaporous permeate enriched in component A from module 25, producing a combined permeate side mixture 34 which exits from module 25 at a vapor outlet port located near its feed end.

Figure 10:
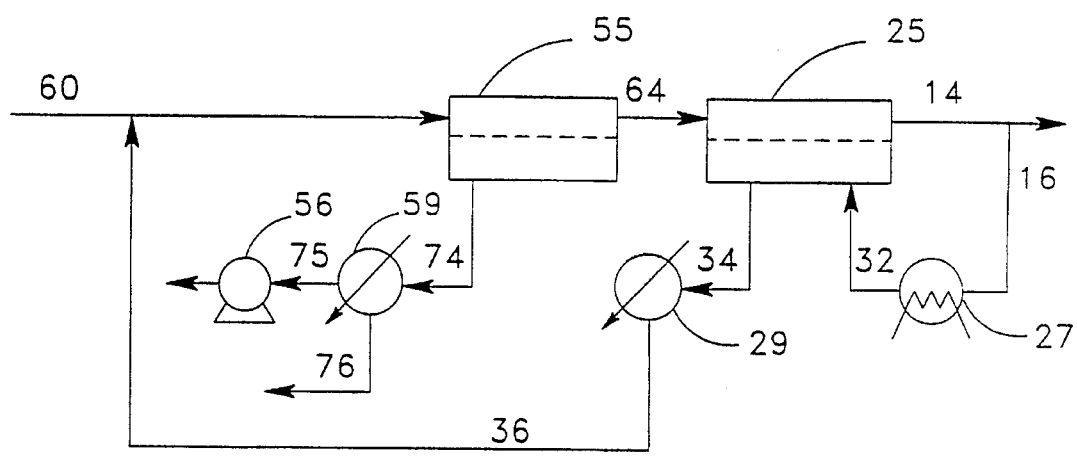

FIG. 10 is a schematic of a system that is essentially the same as that depicted in FIG. 9 except that the condensable vapor sweep stream 32 is produced from a portion 16 of the depleted retentate stream 14 using vapor-generator 27. Additionally, FIG. 10 shows the combined permeate side mixture 34 entering a condenser 29, where the combined permeate side mixture is condensed to form condensed permeate 36. The condensed permeate 36 is then recycled to the feed to the conventional pervaporation module 55. FIG. 10 also shows the vaporous permeate stream 74 from the conventional pervaporation module 55 entering a condenser 59, producing a condensed permeate 76. FIG. 10 also includes a stream of noncondensable components 75, which may have entered the system, exiting condenser 59. These noncondensable components are then removed using a vacuum pump 56.

Figure 11:
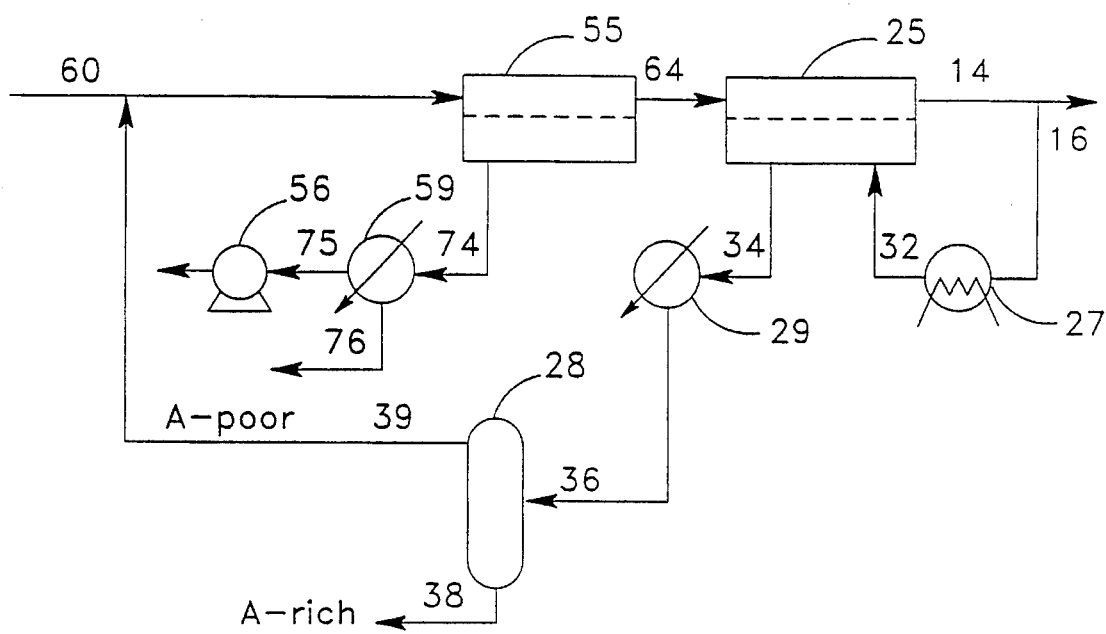

FIG. 11 is a schematic of a system that is essentially the same as that depicted in FIG. 10 except that the condensed permeate 36 is directed to a separation apparatus 28, producing a stream 38 enriched in component A, and a stream 39 depleted in component A, stream 39 then being recycled to the feed to the conventional pervaporation module 55.

Figure 12:
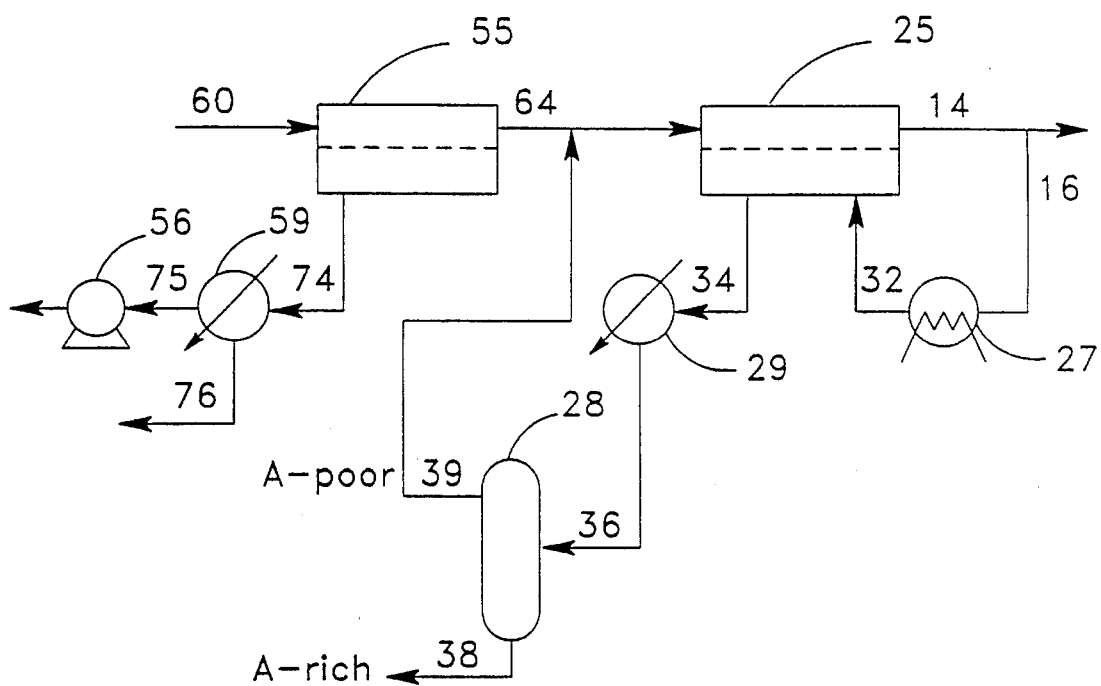

FIG. 12 is a schematic of a system that is essentially the same as the system depicted in FIG. 11 except that the stream 39 depleted in component A is recycled to the feed to the countercurrent condensable sweep module 25.

The liquid mixture comprising the feed stream to the membrane selected for the pervaporation process may be a mixture of at least one organic component with water, or a mixture of organic components. This feed stream may derive from a variety of sources including, but not limited to, industrial process wastewaters, chemical process liquids, the production of fine chemicals, the production of pharmaceuticals, the recovery or purification of flavors and fragrances from natural products, or fermentation processes.

The separation to be achieved by the countercurrent sweep pervaporation process of the present invention may be the removal of volatile compounds from water, the removal of water from organics (also known as dehydration of organics), or the separation of organic mixtures. Generally, the membrane used is selected such that the minor component of the feed stream is selectively removed by the membrane; however, the invention need not be so limited.

For the removal of volatile compounds from water, the volatile compound to be removed can be virtually any compound with sufficient volatility to be removed by pervaporation. Generally, this includes compounds with boiling points that are less than about 200° C. Examples of compounds that can be removed from water by the process of the present invention include, but are not limited to, chlorofluorocarbons such as Freons and Halons; chlorinated hydrocarbons, such as methylene chloride, trichloroethylene, trichloroethanes, carbon tetrachloride, chlorobenzene; nonchlorinated hydrophobic organics, such as benzene, toluene, xylene, ethyl benzene, cyclohexane, hexane and octane; nonchlorinated hydrophilic organics, such as methanol, ethanol, other alcohols, acetone, ethyl acetate, methyl ethyl ketone, methyl t-butyl ketone, other ketones, nitrobenzene, phenols, cresols, formic acid, acetic acid, other organic acids, amines, including triethylamine and pyridine, acetonitrile, dimethyl formamide, dimethylacetamide, and N-methylpyrrolidinone; and inorganic compounds such as ammonia, bromine and iodine.

For the removal of water from organics, the organic can be virtually any compound. Examples include, but are not limited to, ethanol, methanol, other alcohols, acetone, ethyl acetate, dimethylacetamide, dimethylformamid, hydrocarbons such as hexane, octane, and petroleum distillates, as well as oils such as sesame oil and corn oil.

For separation of organic mixtures, the mixtures may comprise various organic species. Organic mixtures that can be separated include, but are not limited to, methanol from other organic solvents, mixtures of isomers and components from natural extracts, olefins from paraffins, and aromatics from non-aromatics, such as the removal of benzene from gasoline or other hydrocarbons.

The membrane used in the process of the present invention can be virtually any material. For removal of volatile compounds from water, the membrane is usually, but not always, an elastomeric or rubbery polymer. Examples of materials useful for such separations include, but are not limited to, natural rubber, nitrile rubber, polystyrene-butadiene copolymers, poly(butadieneacrylonitrile) rubber, polyurethanes, polyamides, polyacetylenes, poly(trimethylsilylpropyne), fluoroelastomers, poly(vinylchlorides), and polysiloxanes, including silicone rubber. Ion-exchange membranes may also be used for some applications.

For removing water from organics, the selective membrane is usually very hydrophilic. Examples of materials useful for removing water from organics include, but are not limited to, polyvinylalcohol, cellulosic materials, chitin and derivatives thereof, polyurethanes, polyamides, poly(acrylic acids), poly(acrylates), poly(vinyl acetates), and polyethers. Blends and copolymers of these materials are also useful.

For separation of organic mixtures, the choice of membrane material will depend on the organics being separated. Many of the polymers listed above for removal of volatile compounds from water and for removal of water from organics may work well for separating certain organic mixtures. In particular, it is often common to use copolymers for separating organics since the ratio of so-called "hard" and "soft" segments can easily be adjusted to provide the desired selectivity.

The membrane may be isotropic or asymmetric. Additionally, the membrane may be homogeneous or a multilayer composite. In most cases, it is preferred that the membrane material be crosslinked to provide sufficient resistance to the chemicals in the feed stream. The membrane may be made by a solvent phase-inversion process, thermally induced phase-inversion process, melt-extrusion process, or by a wet or dry solvent-casting process. In the case of multilayer composites, the selective layer can be formed by dip-coating, painting, spray-coating, solution-coating, or by interfacial polymerization.

In multilayer composites, the support layers that provide mechanical strength to the composite (as opposed to the selective layer) should give as little resistance to the transport of the permeating species through the selective layer as is technically feasible. Additionally, the support membrane should be chemically and thermally resistant, allowing for operation on hot feed streams containing various chemical constituents. Materials suitable for the support membrane include, but are not limited to, organic polymers such as polypropylene, polyacrylonitrile, poly(vinylidenefluorides), poly(etherimides), polyimides, polysulfones, poly(ethersulfones), poly(arylsulfones), poly(phenylquinoxalines), polybenzimidazoles, and copolymers and blends of these materials; and inorganic materials such as porous glass, ceramics, and metals.

The membrane can be used in the form of a flat sheet or hollow fiber or tube. For flat-sheet membranes, the membrane may be placed into a module designed to permit countercurrent flow of the permeate stream relative to the feed stream. This can include plate-and-frame modules or spiral-wound modules. For hollow fibers and tubes, the feed flow may be on the outside (shell side) or inside (tube side) of the fibers. Especially preferred is a tube-side-feed hollow fiber module. The materials used in the membrane module should have sufficient chemical and thermal resistance to permit long-term operation.

In a typical application, the feed stream is heated. Heating the feed stream raises the vapor pressure of the components of the feed mixture, which increases the driving force for transport across the membrane, leading to higher fluxes. The temperature to which the feed stream is heated will depend on the composition of the feed stream and the operating characteristics of the membrane material. In some cases, it is beneficial to slightly pressurize the feed stream so that the temperature of the feed can be raised above the boiling point of the feed at ambient pressure. For most applications, the temperature of the feed stream will be greater than 40° C. and will typically be between 60° and 100° C.

The process of the present invention is particularly useful for applications where each of the partial pressures of the more permeable components present in a vapor phase that is in equilibrium with the feed stream is less than about 100 mmHg. This is because as the more permeable component is removed from the feed stream, its partial pressure decreases, reducing the driving force for transport across the membrane. By using a countercurrent condensable sweep stream according to the process of the present invention, the driving force for transport is maintained without any need to reduce the total pressure of the permeate stream to a value less than that of each component. Although the process of the present invention will be effective for treating feed streams wherein the partial pressure of the more-permeable component is greater than 100 mmHg, the advantages over conventional pervaporation are not as great due to the higher driving force present with the higher partial pressure.

Virtually any condensable vapor may be used as a countercurrent sweep stream. By condensable vapor is meant any compound with a boiling point greater than about −100° C. The condensable vapor may consist of one of the components of the liquid feed solution or it may be a compound that is not present in the feed solution. The condensable vapor may be either miscible or substantially immiscible with at least one component of the liquid mixture.

In one embodiment of the process of the present invention, the condensable vapor-consists of one of the components of the feed solution that is not desired to be transported to the permeate side of the membrane. In this case, a portion of the retentate stream may be used to generate the condensable vapor used as the countercurrent sweep stream.

For removing volatiles from water, water vapor or steam has been found to be particularly effective. For removing water from organics, it has been found that using a vapor stream of the organic is particularly advantageous.

The pressure and temperature of the countercurrent condensable vapor sweep may be set at any value so long as the sweep is a vapor when it enters the membrane module. In some applications, it is advantageous if they are selected such that a portion of the vapor condenses on the permeate side of the membrane. This allows for the heat of condensation to be transferred to the feed stream, resulting in a more constant temperature in the feed. In this case, the initial temperature of the sweep is preferably equal to or greater than the temperature of the liquid mixture directed against the feed side of the membrane.

The volumetric flow of the condensable vapor at the vapor inlet port may be adjusted to provide the desired efficiency. Preferably, the volumetric flow of the condensable vapor is at least 10% of the volumetric flow of the combined permeate side mixture. Additionally, the volumetric flow is typically set such that the condensation of the condensable vapor provides at least 20% of the heat of vaporization required to remove components from the liquid mixture.

The permeate side mixture may be collected by freezing or condensing the mixture, after which the transported component may be separated. This separation step may be performed by the most convenient method, such as by decantation, distillation, liquid/liquid extraction, evaporation, crystallization, freezing, adsorption, absorption, by extraction using a membrane contactor, or by another pervaporation process.

Alternatively, the permeate-side mixture may be directed to a separation apparatus as a vapor. Examples of suitable separation means include, but are not limited to, distillation, fractional condensation, vapor permeation through a membrane, adsorption, and absorption.

The process of the present invention may be used to perform the entire separation desired, or it may be combined with other processes in so-called "hybrid" systems. For example, a conventional pervaporation process can be used to remove the bulk of one component from a feed stream, reducing the concentration such that the partial pressure of the component in equilibrium with the liquid stream is less than about 100 mmHg. The countercurrent condensable sweep pervaporation process of the present invention can then be used to reduce the concentration down to the desired level. The exact level to which the component is removed by the first separation process prior to removal by the countercurrent condensable sweep pervaporation process is determined by the relative convenience and cost of the two processes.

In some cases, various streams from the hybrid process may be recycled to other points within the process to improve efficiency, to improve the quality of the separation, or to reduce operating costs. For example, in the hybrid system shown in FIG. 10, the condensed permeate side mixture 36 is recycled back to the feed to the conventional pervaporation process. This option is attractive when the concentration of the component being removed from the feed stream (component A) in the condensed permeate-side mixture from the countercurrent pervaporation process 36 is close to the concentration of component A in the initial feed stream 60. Optionally, FIG. 11 shows that the permeate side mixture 36 can first be separated into a stream 38 concentrated in component A and a stream 39 depleted in component A, which can then be recycled to the feed to the conventional pervaporation process.

Another particularly attractive hybrid system comprises a distillation process coupled with the countercurrent pervaporation process of the present invention. Here, the liquid exiting the top of the distillation column is sent to the countercurrent pervaporation process to remove remaining impurities. The permeate from the countercurrent pervaporation process, now enriched in component A, can be added directly into the distillation column at the appropriate position in the column.

Many other hybrid systems can be envisioned that incorporate the countercurrent pervaporation process of the present invention. One reasonably skilled in the arts of membrane systems and chemical engineering will readily appreciate that through the use of the appropriate separation process and the proper use of recycle streams, highly efficient, low-cost processes can be developed.

Example 1

Utilizing a system of substantially the same configuration as shown in FIG. 3, a feed solution 10 containing 8900 ppm acetone in water at 59° C. and essentially ambient pressure, was fed at a rate of 29 ml/min to the lumens of hollow fiber membranes in module 25. The module 25 comprised 183 composite hollow fibers with inside diameters of 365 µm. The effective length of the fibers was 40 cm. The inside surfaces of the hollow fibers were coated with a selective layer of crosslinked poly(dimethylsiloxane) (PDMS). The module had an effective membrane area of 0.084 m$^2$.

A condensable water vapor sweep stream 32 at 60° C. and 0.2 atm was introduced to the permeate side of the membrane at a vapor inlet port located near the retentate end of the module so as to flow substantially countercurrent to the flow of the feed. The flow rate of the water vapor sweep was set at 0.7 gm/min.

A combined permeate side mixture 34 that comprised the condensable vapor sweep stream and the acetone that selectively permeated the membrane was withdrawn at a vapor outlet port located near the feed end of the module. The combined permeate side mixture 34 was sent to a first condenser 29 cooled with a dry ice/isopropyl alcohol (IPA) solution to a temperature of approximately −75° C. Any vapors not removed in this condenser were removed in a second condenser (not shown) cooled with liquid nitrogen to a temperature of approximately −195° C. A vacuum pump 26 was used to remove any noncondensable components that may have entered the system. The condensates from the dry ice/IPA and liquid nitrogen condensers were combined to form a single acetone solution 36.

Under the operating conditions described above, the retentate stream 14 was at a temperature of 58° C., resulting in a temperature drop of only 1° C. The retentate had an acetone concentration of 6300 ppm. Solution stream 36 had an acetone concentration of 107,000 ppm, which corresponds to a selectivity of 12 for acetone over water relative to the feed solution. The acetone permeability through the membrane was $1.8 \times 10^{-4}$ kg/m$^2$-day-ppm.

Comparative Example 1

For comparison, the system described in Example 1 was operated as a conventional pervaporation system, that is, with a vacuum on the permeate side but with the countercurrent condensable sweep flow set to 0, so that no water vapor was introduced as a condensable vapor sweep stream to the membrane module. The permeate was kept at a pressure of 0.2 atm. The results of this comparative run and those of Example 1 are summarized in Table 1.

TABLE 1

| Example | Temp. Drop (°C.) | Selectivity | Acetone Permeability (kg/m²-day-ppm) |
| --- | --- | --- | --- |
| 1 | 1 | 12 | 1.8 × 10⁻⁴ |
| Comparative Example 1 | 6 | 15 | 0.5 × 10⁻⁴ |

As is apparent from Table 1, when using a countercurrent condensable vapor sweep stream, the acetone permeability was 3.6 times higher than that obtained using the conventional system, while the selectivities were essentially the same for practical purposes. In addition, the temperature drop through the module when using a countercurrent condensable vapor sweep stream was only 1° C., whereas the temperature drop was 6° C. when using the conventional system.

Examples 2–5

Additional runs were performed using the same system and conditions given in Example 1, except that the flow rate of the countercurrent condensable water vapor sweep stream was varied. The results are summarized in Table 2.

TABLE 2

| Example | Sweep Stream Flow gm/min | Temp. Drop (°C.) | Selectivity | Acetone Permeability (kg/m²-day-ppm) |
| --- | --- | --- | --- | --- |
| 2 | 1.6 | 1 | 4 | 2.4 × 10⁻⁴ |
| 3 | 2.0 | 2 | 4 | 2.4 × 10⁻⁴ |
| 4 | 3.5 | 1 | 3 | 3.1 × 10⁻⁴ |
| 5 | 4.2 | 1 | 3 | 3.6 × 10⁻⁴ |

Example 6

The system described in Example 1 was operated as described in Example 1 except that the feed solution consisted of 248 ppm toluene in water fed to the lumens of the hollow fiber membrane module at a rate of 28 ml/min.

Comparative Example 2

For comparison, the system described in Example 6 was operated as described in Comparative Example 1 with the feed solution toluene concentration at 325 ppm. The results of this Comparative Example and of Example 6 are summarized in Table 3.

TABLE 3

| Example | Temp. Drop (°C.) | Selectivity | Toluene Permeability (kg/m²-day-ppm) |
| --- | --- | --- | --- |
| 6 | 1 | 170 | 9.9 × 10⁻⁴ |
| Comparative Example 2 | 4 | 220 | 5.3 × 10⁻⁴ |

As is apparent from Table 3, when using the countercurrent condensable vapor sweep stream process of the present invention the toluene permeability was 1.7 times higher, the temperature drop was only 1° C. (as compared to 4° C.), while the selectivity was comparable.

Example 7

Utilizing a system of substantially the same arrangement shown in FIG. 3, a feed solution 10 containing 4.9 wt % water in ethanol at 68° C. at an absolute pressure of 1.26 atm, was fed at a rate of 11.0 g/min to the lumens of hollow fiber membranes in module 25. The module 25 had an effective membrane area of 0.008 m² and comprised 40 composite hollow fibers with an effective length of 40 cm and the inside surfaces of the hollow fibers were coated with a hydrophilic polymer.

A condensable ethanol vapor sweep stream 32 at 50° C. and 0.1 atm was introduced to the permeate side of the membrane at a vapor inlet port located near the retentate end of the module so as to flow substantially countercurrent to the flow of the feed. The flow rate of the ethanol vapor sweep was set at 2.4 g/min.

A combined permeate side mixture 34 that comprised the condensable vapor sweep stream and the water that selectively permeated the membrane was withdrawn at a vapor outlet port located near the feed end of the module. This combined permeate side mixture was condensed using the same method described in Example 1. Under these operating conditions, the water flux through the membrane was 22 kg/m²-day.

Comparative Example 3

For comparison, the system described in Example 7 was operated as a conventional pervaporation system with a vacuum on the permeate side, but with the countercurrent condensable ethanol vapor sweep flow set to 0, so that no ethanol vapor was introduced to the membrane module. The pressure on the permeate side of the membrane was then adjusted to 0.01 atm, resulting in a water flux through the membrane that was the same as that obtained in Example 7. This illustrates that one-tenth the vacuum is required on the permeate side of the membrane with the countercurrent condensable vapor sweep process to achieve the same rate of transport through the membrane, resulting in lower capital and operating costs.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A countercurrent sweep pervaporation process for the removal of at least one component of a liquid mixture feed comprising more than one component, said process comprising the steps of:
   (a) providing a membrane that has a feed side and a permeate side and is selectively permeable to said at least one component, and is located within a chamber that has a permeate side vapor inlet port and a permeate side vapor outlet port;
   (b) providing a pressure difference across said membrane such that the pressure on said permeate side of said membrane is less than the pressure on said feed side of said membrane;
   (c) directing said liquid mixture feed against said feed side of said membrane wherein the concentration and pressure of said at least one component of said liquid mixture feed on said feed side are such that the partial pressure of said at least one component in a hypothetical vapor phase in equilibrium with said liquid mixture feed exceeds the partial pressure of said at least one component on said permeate side;

(d) providing a sweep stream of condensable vapor, wherein said condensable vapor
  (i) comprises vapor of a component of said liquid mixture feed other than said at least one component,
  (ii) has a boiling point greater than −100° C. at atmospheric pressure, and
  (iii) has an initial temperature equal to or greater than the temperature of said liquid mixture feed;

(e) directing said sweep stream of condensable vapor past said permeate side of said membrane in a manner such that the flow of said sweep stream is substantially countercurrent to the direction of substantially the entire flow of said liquid mixture feed, thereby transporting at least a portion of said at least one component of said liquid mixture feed from said feed side to said permeate side of said membrane to form a combined permeate side mixture of said condensable vapor and said at least one component, wherein the volumetric flow of said condensable vapor at said vapor inlet port is at least 10% of the volumetric flow of said combined permeate side mixture at said vapor outlet port; and (f) removing said combined permeate side mixture from said permeate side of said membrane.

2. A countercurrent sweep pervaporation process for the removal of at least one component of a liquid mixture feed comprising more than one component, said process comprising the steps of:

(a) providing a membrane that has a feed side and a permeate side is selectively permeable to said at least one component, and is located within a chamber that has a permeate side vapor inlet port and a permeate side vapor outlet port;

(b) providing a pressure difference across said membrane such that the pressure on said permeate side of said membrane is less than the pressure on said feed side of said membrane;

(c) directing said liquid mixture feed against said feed side of said membrane wherein the concentration and pressure of said at least one component of said liquid mixture feed on said feed side are such that the partial pressure of said at least one component in a hypothetical vapor phase in equilibrium with said liquid mixture feed exceeds the partial pressure of said at least one component on said permeate side;

(d) providing a sweep stream of condensable vapor, wherein said condensable vapor
  (i) is produced from a portion of the retentate stream from said countercurrent sweep pervaporation process,
  (ii) has a boiling point greater than −100° C. at atmospheric pressure, and
  (iii) has an initial temperature equal to or greater than the temperature of said liquid mixture feed;

(e) directing said sweep stream of condensable vapor past said permeate side of said membrane in a manner such that the flow of said sweep stream is substantially countercurrent to the direction of substantially the entire flow of said liquid mixture feed, thereby transporting at least a portion of said at least one component of said liquid mixture feed from said feed side to said permeate side of said membrane to form a combined permeate side mixture of said condensable vapor and said at least one component, wherein the volumetric flow of said condensable vapor at said vapor inlet port is at least 10% of the volumetric flow of said combined permeate side mixture at said vapor outlet port; and (f) removing said combined permeate side mixture from said permeate side of said membrane.

3. The process of claim 1 or 2 wherein said condensable vapor of step (d) is steam.

4. The process of claim 1 or 2 wherein said condensable vapor of step (d) is an organic compound vapor.

5. The process of claim 1 or 2 wherein said condensable vapor of step (d) is miscible with said at least one component.

6. The process of claim 1 or 2 wherein said condensable vapor of step (d) is substantially immiscible with said at least one component.

7. The process of claim 1 or 2 wherein said liquid mixture feed is a mixture of at least one organic component with water.

8. The process of claim 1 or 2 wherein said liquid mixture feed is a mixture of organic compounds.

9. The process of claim 1 or 2, including an additional step (g) of separating said at least one component from said combined permeate side mixture.

10. The process of claim 9 wherein said combined permeate side mixture is in a state selected from at least partially condensed and at least partially frozen prior to step (g).

11. The process of claim 10 wherein step (g) is conducted by decantation.

12. The process of claim 9 or 10 wherein step (g) is conducted by distillation.

13. The process of claim 10 wherein step (g) is conducted by liquid/liquid extraction.

14. The process of claim 10 wherein step (g) is conducted by evaporation.

15. The process of claim 10 wherein step (g) is conducted by extraction using a membrane contactor.

16. The process of claim 10 wherein step (g) is conducted by a pervaporation process.

17. The process of claim 10 wherein step (g) is conducted by means selected from crystallization and freezing.

18. The process of claim 9 or 10 wherein step (g) is conducted by means selected from adsorption and absorption.

19. The process of claim 9 or 10 wherein step (g) comprises producing a stream enriched in said at least one transported component and a stream depleted in said at least one transported component.

20. The process of claim 19 wherein said stream depleted in said at least one transported component is mixed with said liquid mixture feed.

21. The process of claim 19 wherein said condensable vapor of step (d) is produced from at least a portion of said stream depleted in said at least one transported component.

22. The process of claim 9 wherein step (g) is conducted by permeation through a selectively vapor-permeable membrane.

23. The process of claim 9 wherein step (g) is conducted by fractional condensation.

24. The process of claim 20 wherein said liquid mixture feed comprises a stream from a prior separation step.

25. The process of claim 24 wherein said prior separation step is selected from the group consisting of reverse osmosis, decantation, distillation, pervaporation and vapor permeation.

26. The process of claim 25 wherein said liquid mixture feed comprises the retentate stream from a prior pervaporation step.

27. The process of claim 26 wherein said combined permeate side mixture of step (f) is condensed to form a condensed permeate, and at least a portion of said condensed permeate is recycled to the feed side of the membrane of said prior pervaporation step.

28. The process of claim 27 wherein said condensed permeate is separated into a portion (1) rich in said at least one component and a portion (2) poor in said at least one component, and said portion (2) is recycled to the feed side of the membrane of said prior pervaporation step.

29. The process of claim 25 wherein said condensable vapor sweep stream of step (d) is produced from a portion of the retentate stream from said countercurrent sweep Pervaporation process.

30. The process of claim 25 wherein said combined permeate side mixture of step (f) is condensed and is separated into a portion (1) rich in said at least one component and a portion (2) poor in said at least one component, and said portion (2) is recycled to said feed side of said membrane of said countercurrent sweep pervaporation process.

31. The process of claim 1 or 2 wherein said membrane is in a form selected from a hollow fiber, a flat sheet and a hollow tube.

* * * * *

UNITED STATES PATENT AND TRADEMARK OFFICE
CERTIFICATE OF CORRECTION

PATENT NO. : 5,464,540

DATED : November 7, 1995

INVENTOR(S) : Friesen, Newbold, McCray and Ray

It is certified that error appears in the above-indentified patent and that said Letters Patent is hereby corrected as shown below:

Col. 1, line 30: delete "he" insert -- the --.

Col. 6, line 58: remove hyphen between "vapor" and "consists."

Col. 14, line 2: delete "Pervaporation" and insert -- pervaporation --.

Signed and Sealed this

Third Day of December, 1996

Attest:

BRUCE LEHMAN

Attesting Officer

Commissioner of Patents and Trademarks